March 27, 1928.  1,663,994
J. F. O'CONNOR
FRICTION SHOCK ABSORBING MECHANISM
Original Filed Oct. 1, 1924    2 Sheets-Sheet 2
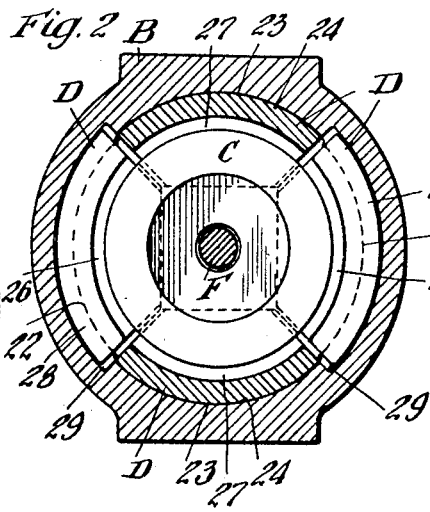
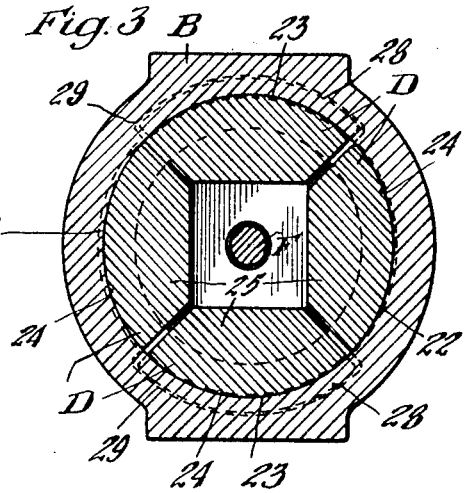
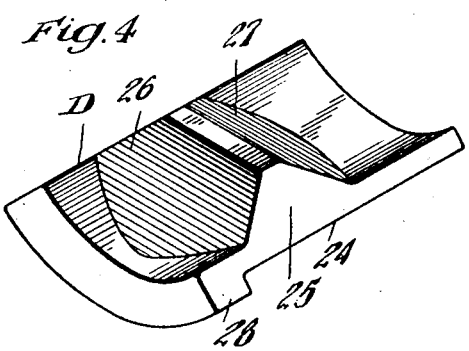
Witnesses
Wm. Geiger
Inventor
John F. O'Connor
By George I. Haight
His Atty.

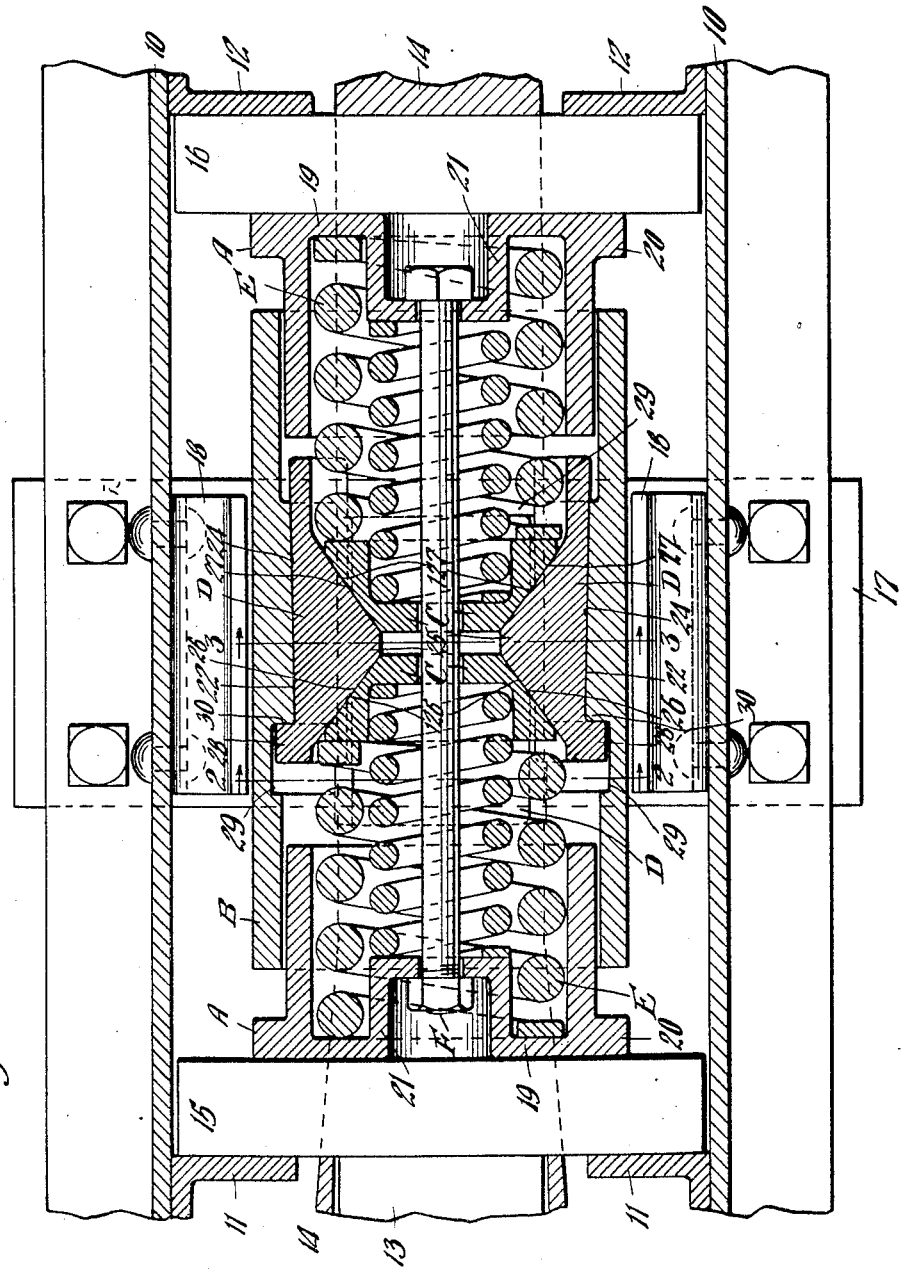

Patented Mar. 27, 1928

1,663,994

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 1, 1924, Serial No. 740,933. Renewed November 28, 1927.

This invention relates to improvements in friction shock absorbing mechanisms.

One object of the invention is to provide a friction shock absorbing mechanism of high capacity, adapted for railway draft riggings, having initial spring action during which the spring resistance elements are partly compressed, and added relatively higher capacity during the remainder of the compression stroke, due to added resistance offered by wedge friction systems, and additional compression of the spring resistance.

Another object of the invention is to provide a friction shock absorbing mechanism of the character indicated, of the double ended type, including a floating cylindrical friction shell having interior friction surfaces with which cooperate a plurality of sets of friction wedge shoes adapted to be moved upon relative appoach of the main followers, and tandem arranged spring means coacting with the main followers and wedge means cooperating with the friction shoes.

A further object of the invention is to provide a friction shock absorbing mechanism, including spring resistance elements, the arrangement being such that after each compression stroke, the springs are available independently of the release of the friction mechanism to return the main followers to normal position and absorb subsequent shocks.

Other objects and advantages of the invention will more clearly and fully appear from the description and claims hereinafter following.

In the drawings forming a part of this specification, Figure 1 is a longitudinal, horizontal, sectional view of a railway draft rigging, showing my improvements in connection therewith. Figures 2 and 3 are transverse, vertical, sectional views of the shock absorbing mechanism proper, corresponding respectively to the lines 2—2 and 3—3 of Figure 1. Figure 4 is a detailed, perspective view of one of the wedge friction shoes employed in connection with my improved mechanism.

In said drawings, 10—10 denote the usual channel-shaped center or draft sills of a railway car underframe, to the inner faces of which are secured front stop lugs 11 and rear stop lugs 12. The inner end portion of the drawbar is indicated at 13, to which is operatively connected a hooded yoke 14 of well-known form. Disposed within the yoke is the shock absorbing mechanism proper, including a front follower 15 and a rear follower 16. The movable parts of the draft rigging are operatively supported by a detachable saddle plate 17. The mechanism herein illustrated is of that type comprising a cylindrical friction shell and in order to maintain the shell properly centered, guide members 18—18 are provided at opposite sides of the same, the guide members being suitably secured to the inner faces of the draft sills.

The improved shock absorbing mechanism proper, comprises broadly, front and rear follower acting casings A—A; a centrally disposed floating friction shell B; front and rear wedge acting spring followers C—C; two pairs of wedge friction shoes D—D; tandem arranged spring resistant elements E—E; and a retainer bolt F.

The front and rear follower casings A are of like construction. Each casing A is in the form of a cylindrical shell open at its inner end and provided with the transverse wall 19 at its outer end, the wall 19 bearing on the inner face of the corresponding main follower and being extended laterally beyond the outer surface of the shell to provide an annular flange 20 which cooperates with the corresponding end of the friction shell to limit the inward movement of the follower. On the inner side of the end wall 19 is provided an inwardly projecting hollow boss 21, for a purpose hereinafter described.

The friction shell B, which is also of cylindrical form is open at its opposite ends and is adapted to telescopically receive the cylindrical shell portions of the members A. Midway between the ends of the shell B are provided two sets of opposed, interior, cylindrical friction surfaces 22—22 and 23—23, the friction surfaces 22 and 23 being curved transversely of the mechanism. The opposed friction surfaces 22 converge slightly forwardly of the mechanism, while the opposed friction surfaces 23 converge rearwardly thereof. The parts are so proportioned that the flanges 20 of the front and rear follower casings are adapted to engage the opposite ends of the respective follower casings when the mechanism is fully compressed and cause the actuating force to be transmitted directly through the follower casings and the shell B to the corresponding stop lugs.

The four friction shoes D are all of like construction, and are arranged in a circular series, one pair of opposed shoes cooperating with the shell friction surfaces 22 and the other pair cooperating with the shell friction surfaces 23. Each shoe D has a curved outer friction surface 24 adapted to cooperate with one of the curved interior friction surfaces of the friction shell A. On the inner side, that is, the side nearest the axis of the mechanism, each shoe has a lateral projection 25 provided with front and rear wedge faces 26 and 27. Each shoe also has an outwardly projecting, lateral flange 28 at one end thereof, for a purpose hereinafter described. The opposed shoes which cooperate with the friction surfaces 22 have the flanged ends thereof forwardly disposed, while the shoes cooperating with the friction surfaces 23 have the flanged ends thereof rearwardly disposed. As clearly shown in Figures 1, 2 and 3, the inner wall of the friction shell is provided with two sets of opposed recesses 29—29 adapted to respectively accommodate the flanges 28 of the pairs of shoes D. The recesses 29 coacting with the flanges 28 of the shoes engaging the friction surface 22 being located at the forward end of said friction surfaces, providing inner shoulders 30 adapted to cooperate with the flanges of said shoes to limit the rearward movement thereof. The openings 29 which accommodate the flanges 28 of the remaining pair of shoes are disposed at the rear ends of the friction surfaces 23 at the top and bottom of the shell. The inner end walls of the last named openings also provide stop shoulders 30 which cooperate with the flanges 28 of the last named pair of shoes D to limit their forward movement.

As clearly shown in Figure 1, in the normal full release position of the parts, the inner end of the front shell A is normally slightly spaced from the front ends of the friction shoes D which cooperate with the friction surfaces 23 and the front end of the rear shell A is similarly spaced from the rear ends of the friction shoes D cooperating with the friction surfaces 22, thereby providing for limited relative movement of the follower shells A with reference to the friction shell B before the shoes are actually engaged and moved by said followers.

The spring followers C—C are of like construction, each being in the form of a cap having one step of opposed wedge faces 126 adapted to cooperate with the wedge faces 26 of the corresponding pair of shoes. Each spring follower also has a second set of opposed faces 127 correspondingly inclined to and adapted to cooperate with the faces 27 of the other pair of shoes. Upon reference to Figures 1, 2 and 3, it will be seen that the wedge faces 126 of the front spring follower member C cooperate with the friction shoes D which engage the friction surfaces 22 of the shell and that the faces 127 of the rear spring follower C bear on the faces 27 of these shoes when the mechanism is in normal full release position. The faces 126 of the rear spring follower and the faces 127 of the front spring follower cooperate in a similar manner respectively with the faces 26 and 27 of the remaining pair of shoes.

The tandem arranged spring resistance elements E—E consist of front and rear sets of springs, each spring comprising an outer relatively heavy coil having its opposite ends bearing respectively on the wall 19 of the corresponding follower member A and the outer end of the corresponding spring follower, and an inner, relatively light coil having the outer end bearing on the boss 21 of the corresponding follower and its inner end seated within the recess of the corresponding cup-shaped spring follower.

The retainer bolt F has its front and rear ends respectively anchored within the hollow bosses of the front and rear follower casings A. The shank of the bolt extends through aligned openings provided in the spring followers C. The bolt F serves to maintain the mechanism of uniform, overall length and holds the parts assembled and under initial compression.

As wear occurs on the various friction and wedge faces, compensation therefor is had, due to the expansive action of the front and rear sets of springs, which as hereinbefore pointed out are under initial compression, suitable clearance being left between the inner ends of the front and rear spring follower members for this purpose.

The operation of the mechanism, assuming in inward or buffing movement of the drawbar, is as follows. As the drawbar moves rearwardly, the front follower 15 and the corresponding casing A are forced rearwardly also, compressing the front spring resistance E between the casing and the front spring follower C which has its rearward movement limited by engagement with the corresponding pair of wedge shoes D, which in turn has its rearward movement limited by the shoulders 30 engaged by the flanges 28. Due to the floating arrangement of the friction shell B, the rear spring resistance member E will be simultaneously compressed between the wall 19 of the rear follower shell A and the rear spring follower member C, the latter being forced rearwardly in unison with the friction shell by engagement of the wedge faces 26 of the corresponding pair of friction wedge shoes with the wedge faces 126. It will be evident that the pair of wedge friction shoes last referred to is forced rearwardly with the shell, due to engagement of the flanges 28 thereof with the rear shoulders 30.

As will be evident, during the initial action just described, there will be no relative movement of the shell and friction shoes, the compression of the mechanism merely effecting compression of the tandem arranged springs. As the described action continues, the inner end of the front follower shell A will gradually approach the outer ends of the friction shoes of the corresponding pair, while the rear ends of the remaining friction shoes will approach the front end of the rear follower shell. This action continues until the front and rear follower shells engage the corresponding friction shoes, whereupon the two pairs of shoes will be moved relatively to each other and relatively to the friction shell, thereby offering additional resistance to the relative movement of the followers. At the same time, as well as during the initial action of the mechanism, a wedging action will be set up between the respective spring followers and the corresponding friction shoes, pressing the shoes against the friction surfaces of the shell. As the shoes are moved by the respective followers, the front and rear spring followers will be forced apart, each spring follower carrying a pair of shoes on faces 126, only, the faces 127 having no function after initial movement of the shoes, and due to the converging relation of the opposed friction surfaces of the shell, a differential wedge action will be set up, causing the spring followers to move at a greater speed than the corresponding pair of friction shoes, thus effecting additional compression of the spring resistance elements. Movement of the parts will finally be limited by engagement of the flanges of the front and rear follower acting shells with the opposite ends of the friction shell, whereupon the pressure will be transmitted directly through these parts to the rear follower, as hereinbefore pointed out.

It will be seen that the resistance during the last described portion of the compression stroke is greatly increased over that had during the initial action of the mechanism, inasmuch as each set of springs is compressed from both ends, and that to the resistance thus offered is added the frictional resistance between the various shoes D and the friction surfaces of the shell.

Upon reduction of the actuating force, the springs E act to immediately force the shells A apart. As the shells are moved out of engagement with the corresponding friction shoes D, the wedging pressure is materially reduced, thereby permitting the springs to restore the pairs of shoes, the front and rear spring followers and the shell A to normal position. As will be evident, the restoration of the front and rear follower shells A is effected independently of any releasing action of the wedge friction system and that, therefore, in case the friction wedge system should not release properly, the spring resistance elements would still be available to absorb the next succeeding shock to which the mechanism is subjected, and at full capacity.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear follower acting members, relatively movable toward and away from each other; of tandem arranged spring resistance elements interposed between said follower-acting members, a plurality of longitudinally disposed, relatively movable friction shoes interposed between said springs, certain of said shoes cooperating with one of said follower-acting members to be moved thereby during the compression stroke, and the remaining shoes cooperating with the other follower-acting member to be moved thereby during said compression stroke; a friction shell having curved interior friction surfaces with which said shoes cooperate and means for pressing said shoes against said surfaces, said means including a pair of relatively movable lateral wedge pressure creating members adapted to be resisted by the respective spring resistance elements.

2. In a friction shock absorbing mechanism, the combination with front and rear followers relatively movable toward and away from each other; of tandem arranged springs interposed between said followers; and means interposed between said springs, actuated by the relative movement of said followers for forcing said springs apart, said means including a longitudinally disposed friction element, relatively movable friction shoes adapted to be actuated respectively by said followers and cooperating with said friction element, and wedge elements cooperating with said springs.

3. In a friction shock absorbing mechanism, the combination with front and rear followers relatively movable toward and away from each other; of spring resistance elements interposed between said followers, one of said spring elements being associated with each follower; a wedge friction shoe coacting with each follower; a wedge pressure transmitting member coacting with each shoe, and adapted to be moved by the latter upon relative movement of the front and rear followers to apply pressure to the inner ends of said tandem springs; and a lateral pressure resisting member having friction surfaces cooperating with said shoes.

4. In a friction shock absorbing mechanism, the combination with front and rear followers; of a friction shell interposed between said followers, said shell having two sets of longitudinally disposed, opposed, interior friction surfaces; friction means interposed between said followers, said means including wedge members, and a pair of friction shoes coacting with each follower and one of said wedge members, said pairs of shoes coacting respectively with the two sets of shell friction surfaces; and yielding, movement-resisting means interposed between each wedge member and one of the followers.

5. In a friction shock absorbing mechanism, the combination with front and rear follower acting means; of a cylindrical friction shell interposed between said follower-acting means, said shell having two sets of opposed, longitudinally arranged, interior friction surfaces, one set of said surfaces converging rearwardly of the mechanism and the other set converging forwardly of said mechanism; front and rear pairs of wedge friction shoes cooperating with the respective sets of friction shell surfaces and adapted to be actuated by said follower-acting means; front and rear wedges cooperating with said shoes; and front and rear spring resistance elements cooperating with the respective wedges.

6. In a friction shock absorbing mechanism, the combination with front and rear follower acting means; of a friction shell interposed between said follower acting means, said shell having its opposite ends normally spaced from the respective follower-acting means and being further provided with interior, friction surfaces arranged in oppositely converging pairs; front and rear pairs of friction shoes cooperating with the respective pairs of friction surfaces of the shell, said pairs of shoes being adapted to be actuated by the respective follower-acting means, said shoes being normally spaced from said follower-acting means to permit of preliminary action of the mechanism; front and rear wedges cooperating with said shoes; and front and rear spring resistance elements cooperating with the respective wedges.

7. In a friction shock absorbing mechanism, the combination with front and rear follower acting means; of a friction shell interposed between said follower-acting means, said shell having a plurality of longitudinally disposed, interior, curved friction surfaces; two sets of friction shoes cooperating with the shell friction surfaces and adapted to be actuated by said follower-acting means during compression of the mechanism; a wedge engaging each set of friction shoes; and tandem arranged springs interposed between said follower-acting means and cooperating with said wedges.

8. In a friction shock absorbing mechanism, the combination with front and rear follower acting means; of a friction shell interposed between said follower acting means, said shell having a plurality of longitudinally disposed, interior friction surfaces; tandem arranged springs interposed between said follower-acting means, a spring follower cooperating with each spring, each of said spring followers having wedge faces; two sets of friction wedge shoes cooperating with the wedge faces of said spring followers; and means for transmitting the actuating force from each follower acting means to one of said sets of friction wedge shoes.

9. In a friction shock absorbing mechanism, the combination with front and rear follower acting shells; a friction shell interposed between said follower acting shells and adapted to telescopically receive the inner ends thereof, said friction shell having interior friction surfaces; a plurality of friction wedge shoes within the friction shell cooperating with the friction surfaces thereof, said shoes being arranged in sets, one set being adapted to be moved by the front follower shell and the other set by the rear follower shell; spring followers having wedge faces coacting with the respective sets of shoes; a spring resistance interposed between each follower shell and spring follower; and coacting means on the shoes and friction shell for limiting movement of each set of shoes with reference to the friction shell in one direction.

In witness that I claim the foregoing I have hereunto subscribed my name this 27th day of September, 1924.

JOHN F. O'CONNOR.